Sept. 29, 1931.  J. W. ANDERSON  1,824,800
ENGINE
Filed Nov. 27, 1929   3 Sheets-Sheet 1
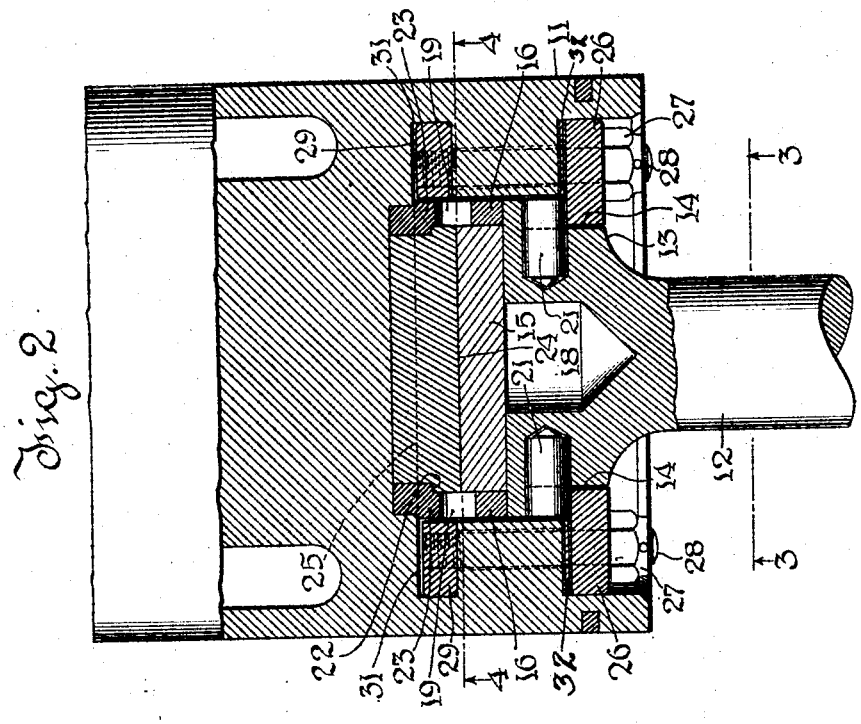
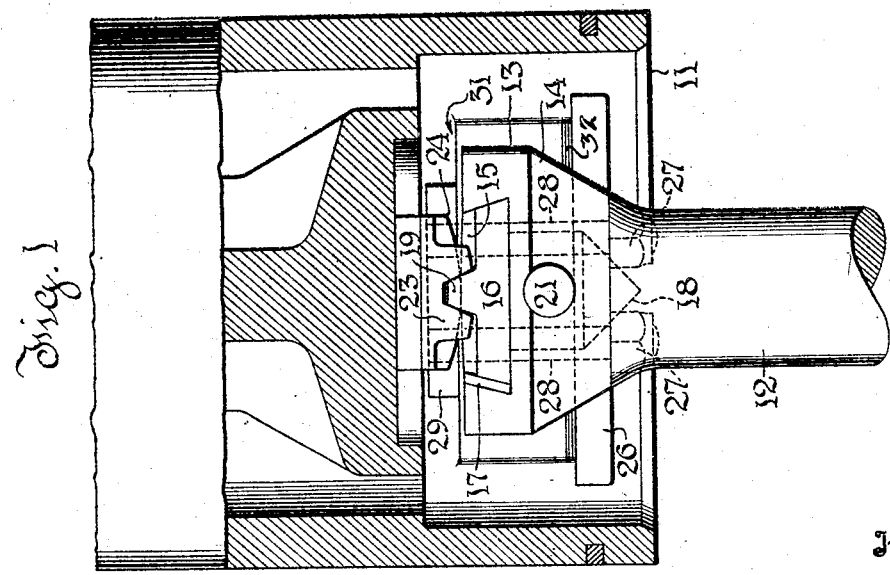
Inventor
John Wallace Anderson
By Dodge and Sons
Attorneys Sept. 29, 1931. J. W. ANDERSON 1,824,800
ENGINE
Filed Nov. 27, 1929 3 Sheets-Sheet 2
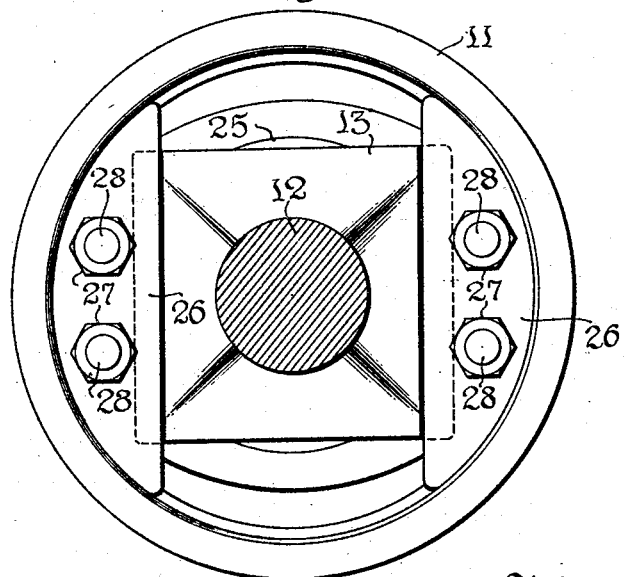
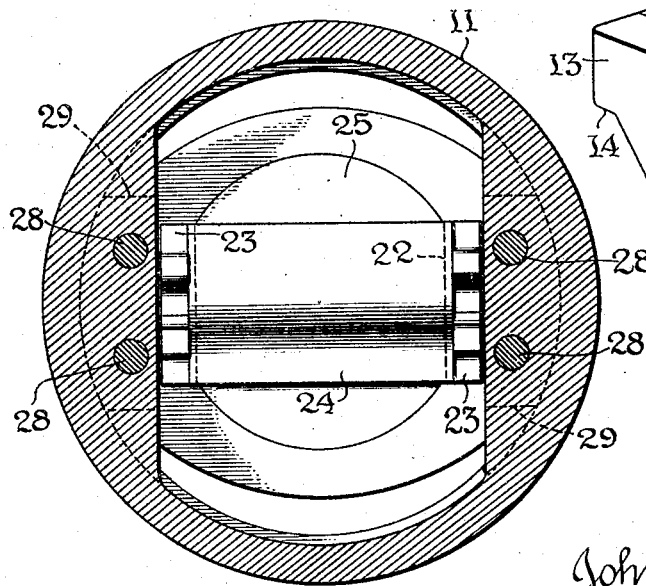
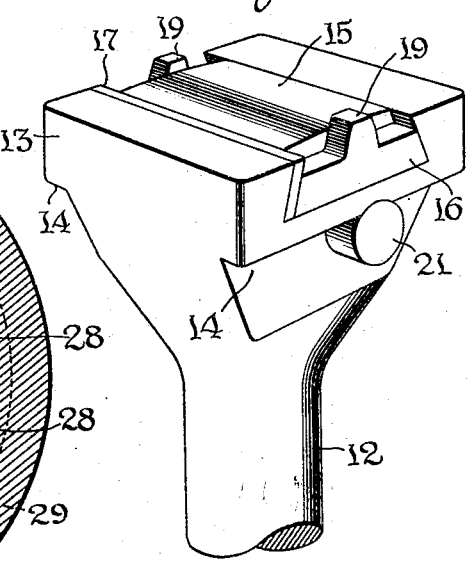
Inventor
John Wallace Anderson Sept. 29, 1931.   J. W. ANDERSON   1,824,800
ENGINE
Filed Nov. 27, 1929   3 Sheets-Sheet 3
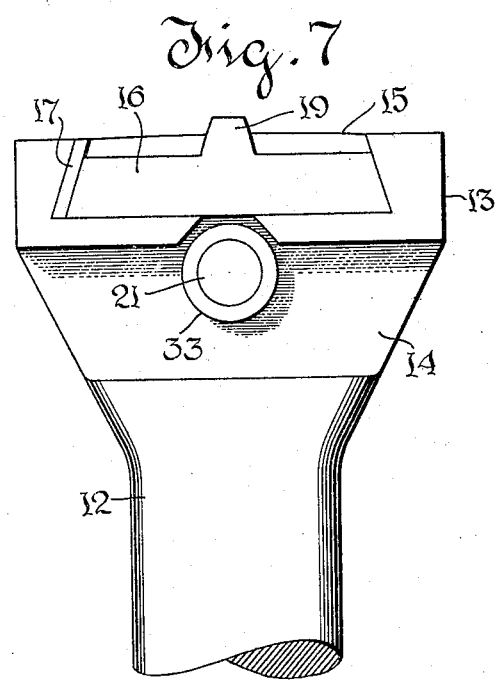
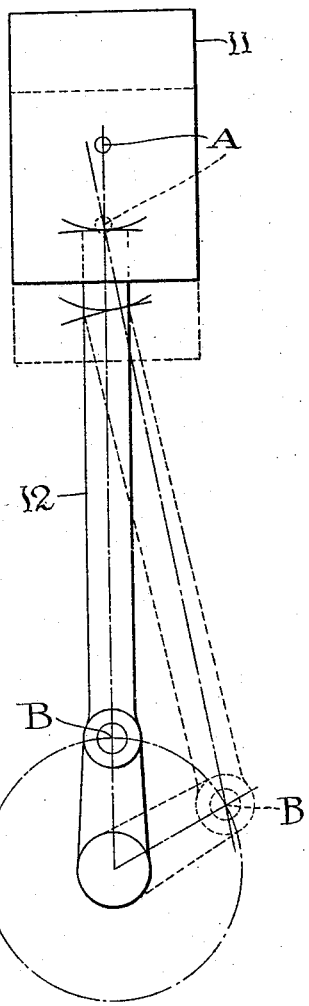
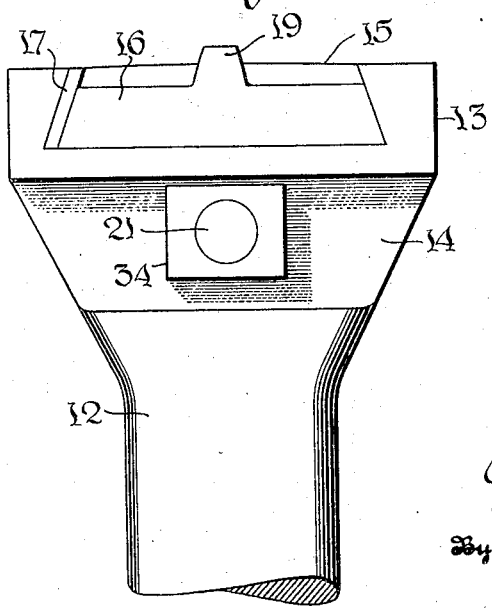
Inventor
John Wallace Anderson
By Dodge and Sons
Attorneys Patented Sept. 29, 1931

1,824,800

UNITED STATES PATENT OFFICE

JOHN WALLACE ANDERSON, OF MILWAUKEE, WISCONSIN, ASSIGNOR TO NORDBERG MANUFACTURING COMPANY, OF MILWAUKEE, WISCONSIN, A CORPORATION OF WISCONSIN

ENGINE

Application filed November 27, 1929. Serial No. 410,207.

This invention relates to wrist pin connections between a pitman or connecting rod and a piston, and is suitable for use wherever the reaction between the pitman and piston is unidirectional, as it is in two cycle single-acting internal combustion engines.

In Diesel engines of the two cycle type, the lubrication of the conventional wrist pin has been a troublesome problem. The trunk piston is relatively hot and the pin, if located near the top of the piston to reduce the overall dimensions of the engine, is subjected to considerable heat. The thrust is unidirectional and it is exceedingly difficult to feed the oil into the lower arc of contact.

The present invention substitutes a true rolling contact between thrust members for the journal pin heretofore used and maintains the rolling contact by a guide structure which preferably takes the form of gear teeth whose pitch lines coincide geometrically with the two thrust surfaces.

The preferred embodiment of the invention is illustrated in the accompanying drawings, in which,—

Fig. 1 is a view, partly in elevation, and partly in vertical axial section, showing a piston and pitman with the invention applied, the plane of section being parallel with the plane of oscillation of the pitman.

Fig. 2 is a similar view, the plane of section being at right angles to the plane of oscillation of the pitman.

Fig. 3 is a section on the line 3—3 of Fig. 2.

Fig. 4 is a section on the line 4—4 of Fig. 2.

Fig. 5 is a perspective view of the head of the pitman.

Fig. 6 is a diagram showing the thrust relations between the piston and connecting rod.

Fig. 7 shows a modification.

Fig. 8 shows a further modification.

The piston is indicated at 11 and may be of any known form. That chosen for illustration is of a type composed of aluminum alloy.

The pitman or connecting rod is indicated generally by the numeral 12. The rod 12 is formed with an enlarged, substantially square head 13 undercut at the sides as indicated at 14. The head 13 has a transverse dovetail slot in which are mounted a thrust block 15 and two toothed elements 16, keyed in place by means of a shim 17. The recess 18 shown in Fig. 2 is merely to reduce weight.

The upper face of the block 15 is hardened and ground. In the preferred form it is cylindrical with its axis coincident with the axis of the crank pin at the opposite end of the rod 12. However, the exact radius of curvature is not absolutely controlling, for other, and particularly longer, radii may be used. A plane is merely a cylindrical surface of infinite radius, and a plane, or any other surface which will enter into rolling contact with a companion block on the piston might be used. The pitch lines of the toothed elements 16 coincide with the geometrical surface of the upper face of block 15.

The undercuts 14 afford clearance for retainer plates on the piston 11 which coact with the trunnion pins 21 fixed in the pitman 12.

The body of the piston is counterbored, and the counterbore is provided with two opposed lateral recesses. These recesses each receive a gear sector 23. The gear sectors are retained by a thrust block 24 which has a circular boss 25 pressed into the counterbore in the piston. The block 24 and sectors 23 are formed with shoulders which engage as indicated at 22. The lower face of the block is hardened and ground to a cylindrical contour, the axis of the cylinder being commonly near the top of the piston. At any rate, the cylindrical surface is of substantial radius. The pitch lines of the gear sectors coincide with the geometrical cylindrical surface of block 24.

The interior of the piston 11 is shouldered to afford seats for two sector shaped retainer plates 26 which are removable upon the removal of nuts 27 from the studs 28. Where the piston 11 is of aluminum alloy or other relatively soft material, it is impracticable to thread these studs directly into the piston as would be the conventional way to mount them. Accordingly they pass through holes in the piston and are threaded into the sector shaped steel plates 29, confined in slots 31 in the piston 11. Shims 32 are preferably used to permit adjustment of the position of the plates 26.

The retainer plates underlie the trunnion pins 21, and hold the parts in assembled relation, so that the piston and rod may be withdrawn together. They do not function in the ordinary operation of the engine as the rod and piston always engage in thrust, which is transmitted through the blocks 15 and 24. These blocks are in rolling engagement with each other and are confined to rolling motion by the interengagement of teeth 19 with the teeth on the sectors 23. The surfaces which roll together coincide with the pitch lines of the meshed teeth.

In some cases the construction shown in Fig. 7 may be used, in which rollers 33 are swiveled on the trunnion pins 21 and engage the retainer plates 26. Another possibility is to use slide blocks 34 as shown in Fig. 8. These are swiveled on trunnion pins 21 and engage plates 26. These constructions would be used in any case in which the pins 21 were subjected to any substantial duty. The paths of the centers of trunnions 21 relatively to piston 11 are cycloids, but, within the range of motion, these are so nearly straight lines that no attempt to illustrate in the drawings corresponding curved surfaces on plates 26 has been made. In most cases the guiding surfaces of plates 26 will be straight, because with unidirectional thrust they have no duty to perform other than to maintain assembly, and precise sliding or rolling contact is not essential.

The advantages of the constructions, particularly that first described, are many. Little or no lubrication is necessary. Although only a line contact between the cylindrical blocks is theoretically secured, the radii of the rolling surfaces are so long that good thrust resistance is developed.

Furthermore, the connecting rod has an effective length which materially exceeds its actual length. This is illustrated in diagram in Fig. 6, in which A is the geometrical axis of the cylindrical thrust surface on the piston and B is the axis common to the crank pin and to the cylindrical thrust surface on the rod 12. In all positions (two being indicated in the diagram) the line of thrust is A—B, and being a common radius, is normal to the common tangent at the point of contact of the thrust arcs. It follows that the effective length of the rod is A. B. and mechanically the same result is secured as would be had by a rod pivoted on a wrist pin at A. The invention thus secures a desirably low ratio of crank to connecting rod, with a rod which is shorter than would be required with conventional arrangements. At the same time, the rod bearing is located low in the piston where it is subject to lower temperatures.

The attainment of the exact result is dependent on the use of a thrust surface coaxial with the crank pin, but useful approximations may be had using other radii. A plane thrust surface on the rod has been successfully used.

What is claimed is,—

1. The combination with a piston and a pitman, of a wrist connection between said piston and pitman, comprising thrust members in rolling contact with each other at least one of said members being cylindrical; guiding means serving to constrain the relative motion of said thrust members to rolling contact; and means for preventing separation of said thrust members including a trunnion on the pitman and a transverse guide member on the piston, said guide member having a cycloidal surface against which said trunnion reacts.

2. The combination with a piston and a pitman, of a wrist connection between said piston and pitman, comprising thrust members in rolling contact with each other, at least one of said members being cylindrical; guiding means serving to constrain the relative motion of said thrust members to rolling contact; and means for preventing separation of said thrust members, including a trunnion on the pitman, a thrust member swiveled on the trunnion, and a transverse guide member on the piston against which said swiveled member reacts.

3. The combination with a piston and a pitman, of a wrist connection between said piston and pitman, comprising thrust members in rolling contact with each other, both of said members being cylindrical and that on the rod being coaxial with the crank pin, and guiding means serving to constrain the relative motion of said thrust members to rolling contact.

4. The combination with a piston and a pitman, of a wrist connection between said piston and pitman, comprising thrust members in rolling contact with each other, both of said members being cylindrical and that on the rod being coaxial with the crank pin, and gear teeth serving to constrain the relative motion of said thrust members to rolling contact.

5. The combination with a piston and a pitman, of a wrist connection between said piston and pitman, comprising thrust members having surfaces in rolling contact with each other, at least one of said surfaces being cylindrical, and interengaging toothed members each associated with a corresponding one of said thrust members and each having a pitch line coinciding with said contacting surface of the member.

6. The combination with a piston and a pitman, of a wrist connection between said piston and pitman, comprising thrust members having surfaces in rolling contact with each other, both of said surfaces being cylindrical and that on the pitman being coaxial with the crank pin, and interengaging toothed members each associatd with a corresponding one of said thrust members, and each having its pitch line coinciding with said contacting surfaces.

7. The combination with a piston and a pitman, of a wrist connection between said piston and pitman, comprising thrust members having surfaces in rolling contact with each other, both of said surfaces being cylindrical and that on the rod being coaxial with the crank pin, and interengaging toothed members each asociated with a corresponding one of said thrust members, and each having its pitch line coinciding with said contacting surfaces.

8. The combination of a piston and inserts mounted therein having two gear toothed projections; a thrust member interposed between said projections and having a thrust surface geometrically defined by the pitch lines of said toothed projections; a pitman; toothed projections mounted thereon; a thrust member interposed between the last-named toothed projections and having a thrust surface geometrically defined by the pitch lines thereof, said two thrust surfaces being in rolling contact with each other; and means for limiting the separation of said thrust surfaces.

9. The combination of a piston and inserts mounted therein having two gear toothed projections; a thrust member interposed between said projections and having a thrust surface geometrically defined by the pitch lines of said toothed projections; a pitman; toothed projections mounted thereon; a thrust member interposed between the last-named toothed projections and having a thrust surface geometrically defined by the pitch lines thereof, said two thrust surfaces being in rolling contact with each other; a rounded stop pin on the pitman; and a coacting elongated stop on the piston serving in conjunction with the stop pin to limit separation of said thrust surfaces.

10. The combination with a piston and a pitman, of a wrist connection between said piston and pitman, comprising thrust members in rolling contact with each other, at least one of said members being cylindrical; gear teeth serving to constrain the relative motion of said thrust members to rolling contact; and means for limiting the separation of said thrust members, said means including a thrust member on the pitman and a guide on the piston, whose guiding surface is a cycloidal curve derived from the rolling motion of said thrust members.

In testimony whereof I have signed my name to this specification.

JOHN WALLACE ANDERSON.